(12) United States Patent
Solomon et al.

(10) Patent No.: US 7,342,648 B2
(45) Date of Patent: Mar. 11, 2008

(54) INFORMATION SENSING AND SHARING SYSTEM FOR SUPPORTING RESCUE OPERATIONS FROM BURNING BUILDINGS

(75) Inventors: Ofer Solomon, Maalot (IL); Avhsalom Ehrlich, Kibbuts Ramot-Hashofet (IL); Tamir Bustnay, Yokneam (IL); Oded Golan, Kfar Vradim (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 34 days.

(21) Appl. No.: 11/177,402

(22) Filed: Jul. 11, 2005

(65) Prior Publication Data
US 2006/0061752 A1    Mar. 23, 2006

(30) Foreign Application Priority Data
Jul. 11, 2004    (IL)    ................................. 162964

(51) Int. Cl.
*G01C 5/00*    (2006.01)
(52) U.S. Cl. ........................................ 356/4.03
(58) Field of Classification Search ........... 356/4.03
See application file for complete search history.

(56) References Cited

U.S. PATENT DOCUMENTS 5,949,529 A * 9/1999 Dunne et al. ............... 356/4.01

6,683,694 B2 * 1/2004 Cornil ......................... 356/627

FOREIGN PATENT DOCUMENTS

GB    WO0025089    * 5/2000

* cited by examiner

*Primary Examiner*—Thomas H. Tarcza
*Assistant Examiner*—Luke D. Ratcliffe
(74) *Attorney, Agent, or Firm*—Mark M. Friedman (57) ABSTRACT

A system for automatic mapping of a walled structure includes at least one mobile unit, preferably worn by a user. The mobile unit has a position tracking system for tracking a current position of the mobile unit, a wall detection system including a sensor arrangement for measuring range data from the mobile unit to at least four points, and a mapping processor associated with both the position tracking system and the wall detection system. The mapping processor processes the range data and, if the at least four points lie on a common plane according to a defined criterion, maps a wall in corresponding spatial relation to the current position. The mobile unit preferably also includes a wireless communication link for transmitting and receiving data indicative of the mapped walls to other mobile units and to a remote command control unit.

20 Claims, 12 Drawing Sheets

Firefighter (1) enters hallway. Automated mapping is transferred to colleagues and command control center.

Command control display shows partial mapping and firefighter positions

FIG. 8C

Firefighter (1) enters first room - automated mapping is broadcast to all nodes and command control.

FIG. 8D

Firefighter (2) enters second room - automated mapping is broadcast to all nodes and command control.

FIG. 8E

INFORMATION SENSING AND SHARING SYSTEM FOR SUPPORTING RESCUE OPERATIONS FROM BURNING BUILDINGS

FIELD AND BACKGROUND OF THE INVENTION

The present invention relates to information systems and, in particular, it concerns an information sensing and sharing system for real-time derivation and sharing of information during entry of teams of firefighters into buildings.

Even when fitted out with the most modern equipment and tools, the modern firefighter may often suffer from disorientation and lack of information when entering a burning building to rescue trapped people. The firefighter needs to know immediately, at all times, and with a high confidence level, the answers to a number of critical questions such as: Where am I? Where are the other members of my team? Where are the centers of the fire? The environment is typically full of various types of buildings, other firefighters, centers of the fire and civilians. Additionally, such situations are often characterized by rapidly developing situations in which lines of sight, ranges of visibility, ranges of transmission and evaluations of the situation may all change rapidly.

Thus, it would be advantageous to provide an information system for supporting rescue operations which would provide each firefighter with answers to some or all of his questions. Specifically, regarding the three basic questions mentioned above, it would preferably provide: relative and/or absolute information to each firefighter about his own position; relative and/or absolute information to each firefighter about the position of his team members, optionally according to criteria (such as limited to a certain number of firefighters or according to what equipment they are carrying); and relative and/or absolute information regarding the positions of the centers of the fire, optionally according to criteria (such as type and size). Most preferably, such a system would also address various other needs such as: facilitating spatial awareness within the building, identifying hidden spaces within which people may be trapped, identifying team members, coordinating efforts between firefighters to reach target locations, and all aspects of information management including collecting data, organizing data, sharing data and displaying data to the users, all in a manner suitable for the scenario of firefighters entering a burning building in order to rescue civilians while the fire continues to spread.

SUMMARY OF THE INVENTION

The present invention is an information sensing and sharing system.

According to the teachings of the present invention there is provided, a system for automatic mapping of a walled structure, the system comprising at least one mobile unit including: (a) a position tracking system for tracking a current position of the mobile unit; (b) a wall detection system including a sensor arrangement for measuring range data from the mobile unit to at least four points; and (c) a mapping processor associated with both the position tracking system and the wall detection system, the mapping processor being configured to process the range data and, if the at least four points lie on a common plane according to a defined criterion, mapping a wall in corresponding spatial relation to the current position.

According to a further feature of the present invention, the mobile unit further includes a wireless communication link for transmitting and receiving data indicative of the mapped walls.

According to a further feature of the present invention, the mobile unit further includes a display for displaying information including the mapped walls.

According to a further feature of the present invention, the mobile unit is configured to be mounted on the body of a user.

According to a further feature of the present invention, the sensor arrangement includes: (a) at least four laser pointers; and (b) an imaging sensor for sensing spots generated by beams from the laser pointers impinging on surfaces.

According to a further feature of the present invention, the at least four laser pointers are spaced around the imaging sensor.

According to a further feature of the present invention, the at least four laser pointers generate substantially parallel beams.

According to a further feature of the present invention, the sensor arrangement is configured for deployment on the torso of a user.

According to a further feature of the present invention, the sensor arrangement is configured for deployment on a helmet worn by a user.

According to a further feature of the present invention, the mapping processor is further configured to identify range data lying beyond a mapped wall as a door.

According to a further feature of the present invention, the position tracking system includes a plurality of inertial sensors.

According to a further feature of the present invention, at least some of the plurality of inertial sensors are associated with footwear of a user.

According to a further feature of the present invention, the position tracking system is further responsive to data from the wall detection system to correct drift in measurements of the plurality of inertial sensors.

According to a further feature of the present invention, the invention is implemented with a plurality of the mobile units each configured to be mounted on the body of a user, wherein each of the mobile units further includes a wireless communication link for transmitting and receiving data indicative of the mapped walls.

According to a further feature of the present invention, the wireless communication links together form a distributed communications network.

According to a further feature of the present invention, there is also provided a remote command control unit in wireless communication with the plurality of mobile units and configured to process the data indicative of the mapped walls from all of the mobile units.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an information sensing and sharing system.

The principles and operation of systems according to the present invention may be better understood with reference to the drawings and the accompanying description.

The information sensing and sharing system of the present invention is based on a combination of: an independent computerized unit on each firefighter for tracking, identification and automatic mapping of his environment; a wireless communication system for sharing and forwarding information across the network; a remote command system for collecting, processing and distributing information to the users, each according to his needs; and a display for displaying to each firefighter relevant information about his surroundings.

Figure 1:
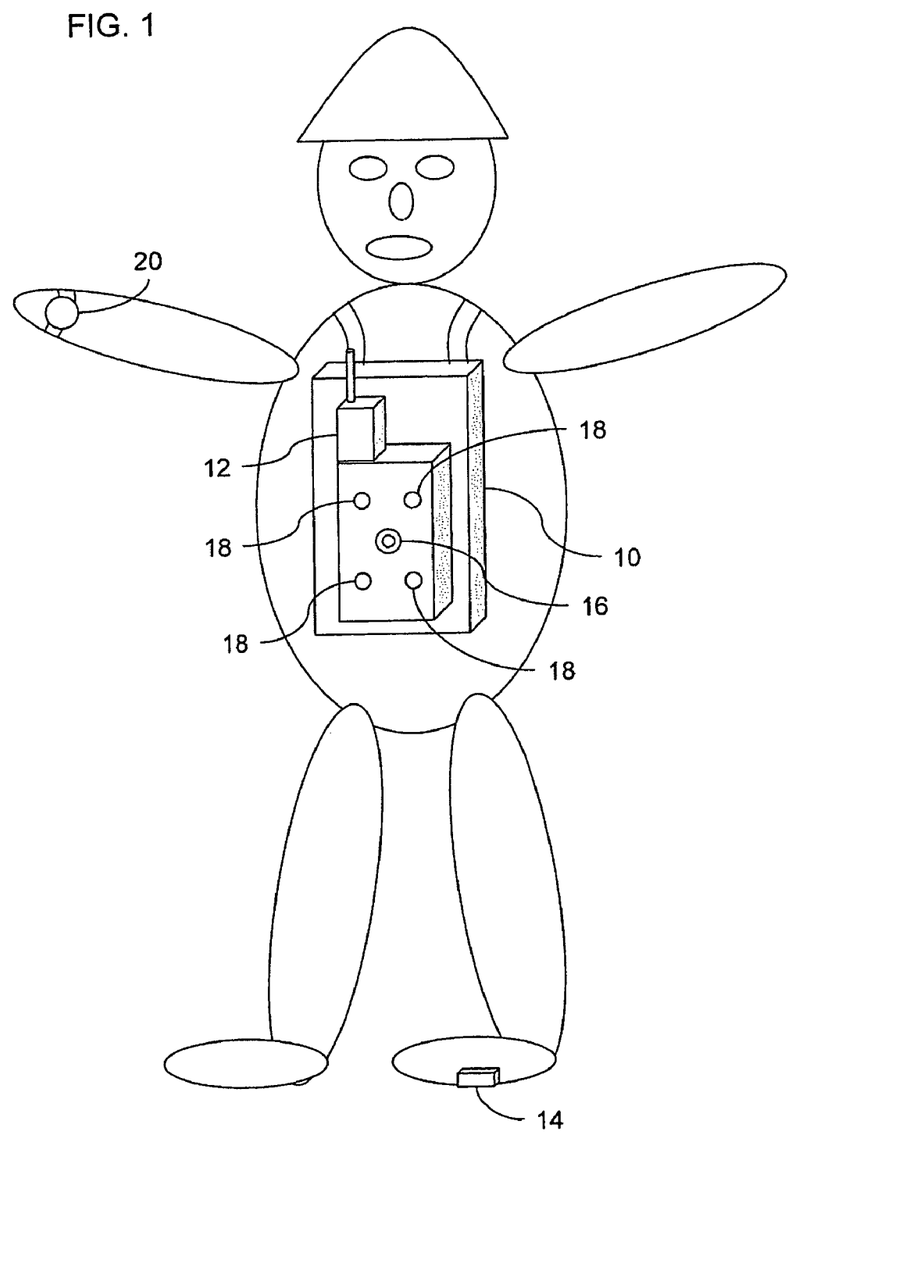
FIG. 1 is a first implementation of a body mounted unit of an information sensing and sharing system, constructed and operative according to the teachings of the present invention.
Figure 2:
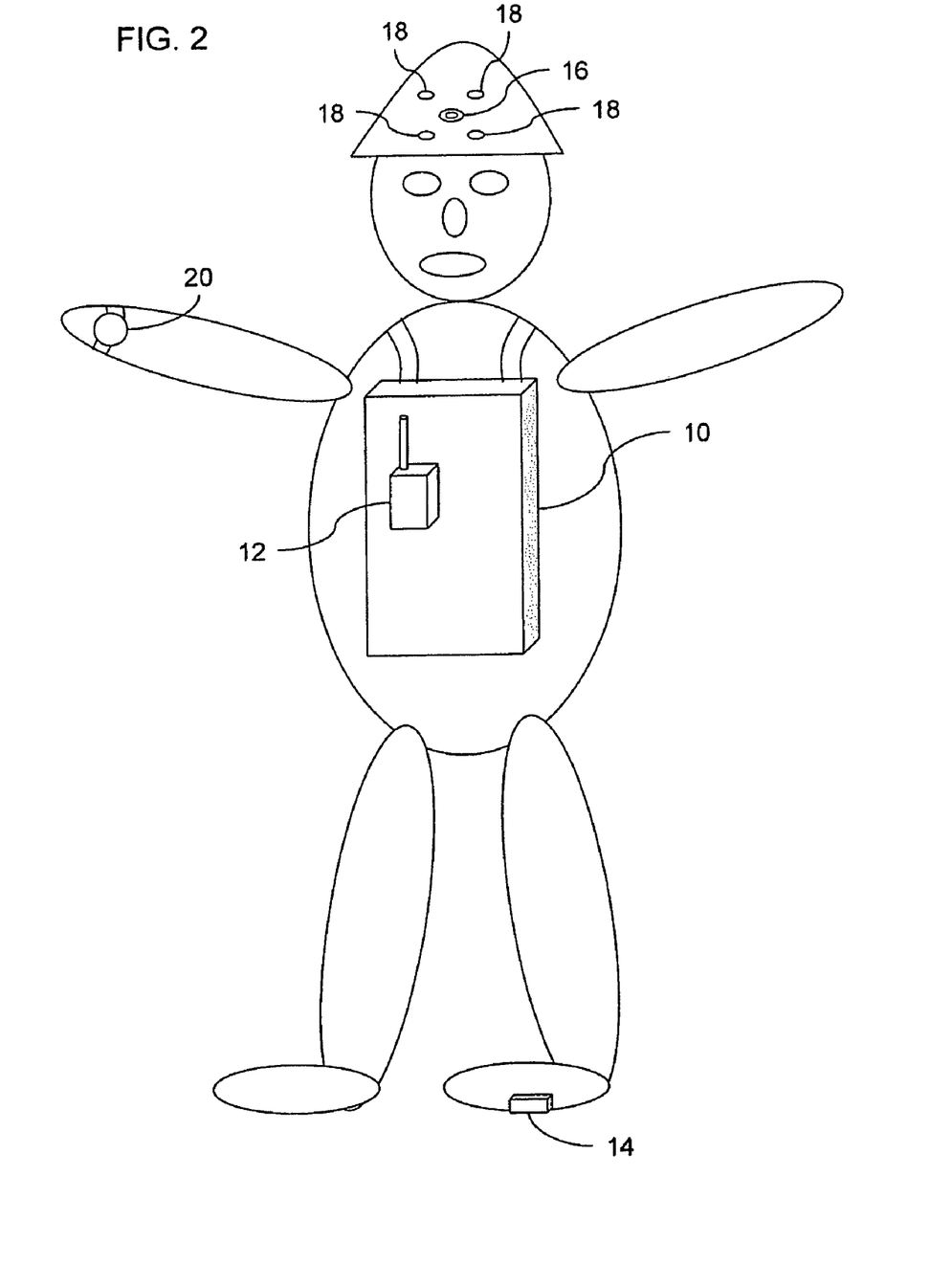
FIG. 2 is a second implementation of a body mounted unit of an information sensing and sharing system, constructed and operative according to the teachings of the present invention.

Turning now to the personal unit carried by each firefighter, this is illustrated schematically according to two variant implementations in FIGS. 1 and 2. In each case, the personal unit includes a wearable computer 10, a communication device 12, an inertial navigation system (INS) 14, a mapping sensor system including a camera 16 and at least four laser pointers 18, and a display system such as a wristwatch-style display unit 20. In the implementation of FIG. 1, the mapping sensor system is implemented on the user's chest, whereas in that of FIG. 2, the mapping sensor system is implemented as part of the user's helmet.

The navigation system and computer 10 together calculate the position of the user at all times. In the case of a user who is not riding in a vehicle, a preferred location for the INS sensors is in the sole of a boot as shown which, together with a stepping-pressure sensor, can be used to calibrate the sensors to zero when the foot has weight on it.

Figure 3:
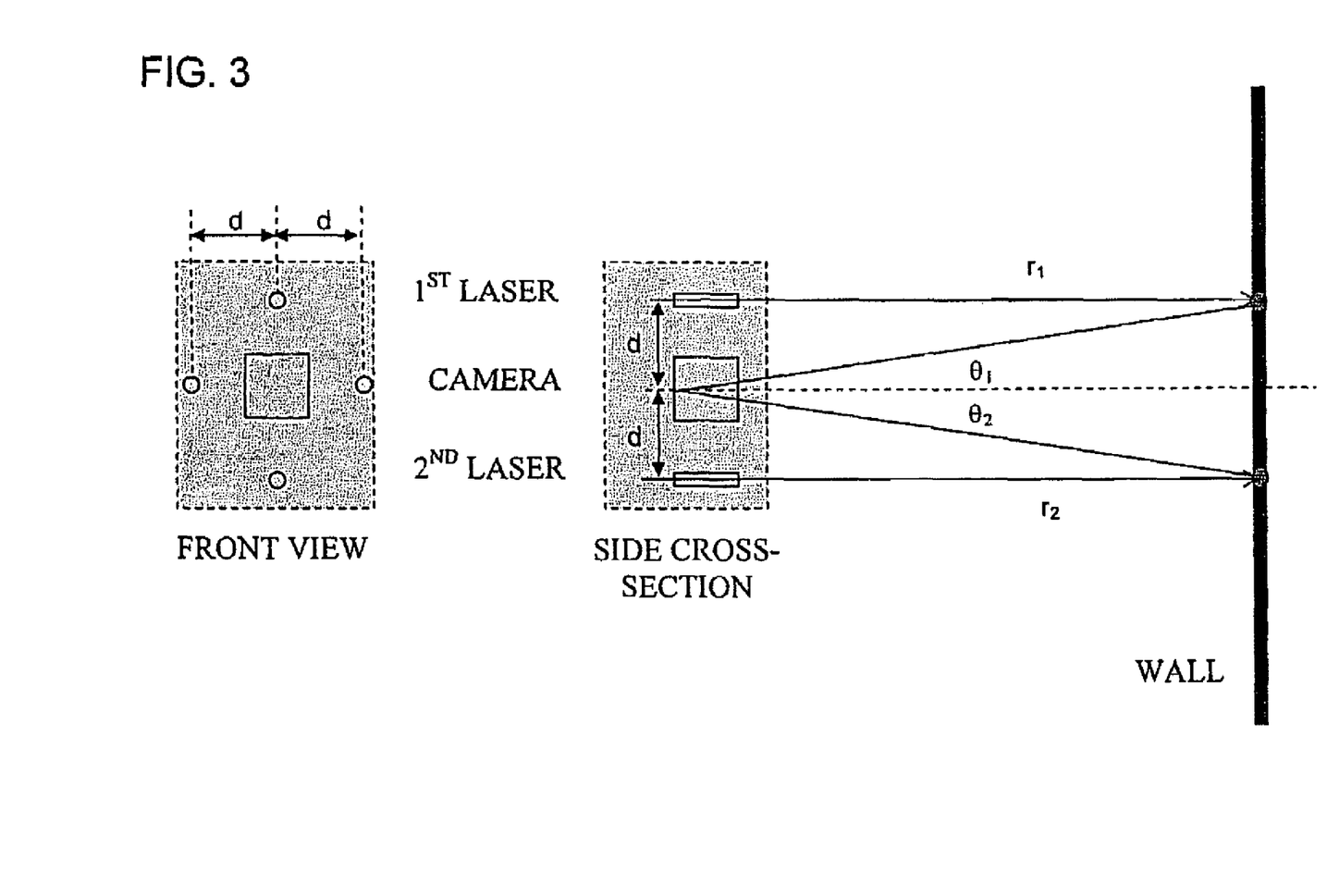
FIG. 3 is a schematic representation of a mapping sensor system from the body mounted unit of FIGS. 1 and 2.
Figure 4A:
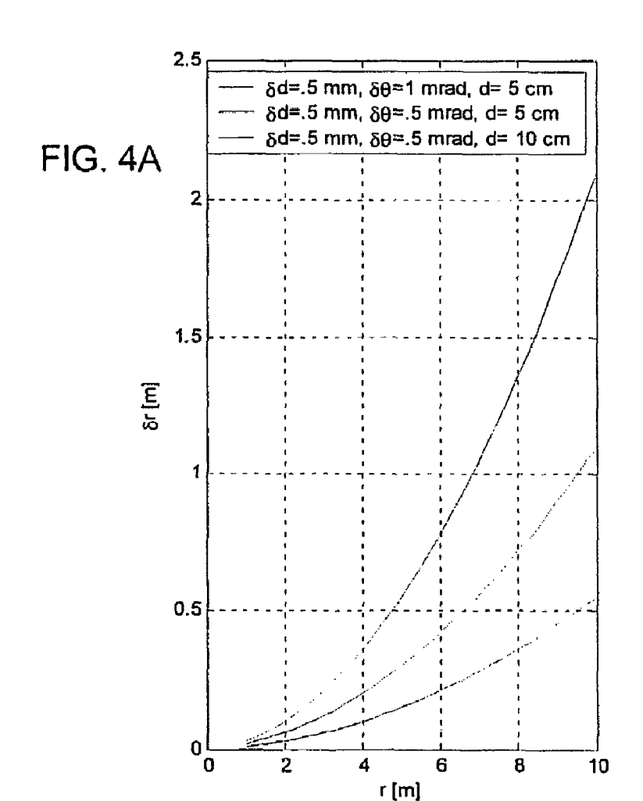
FIGS. 4A and 4B are graphs illustrating the sensitivity of mapping sensor system to errors.
Figure 4B:
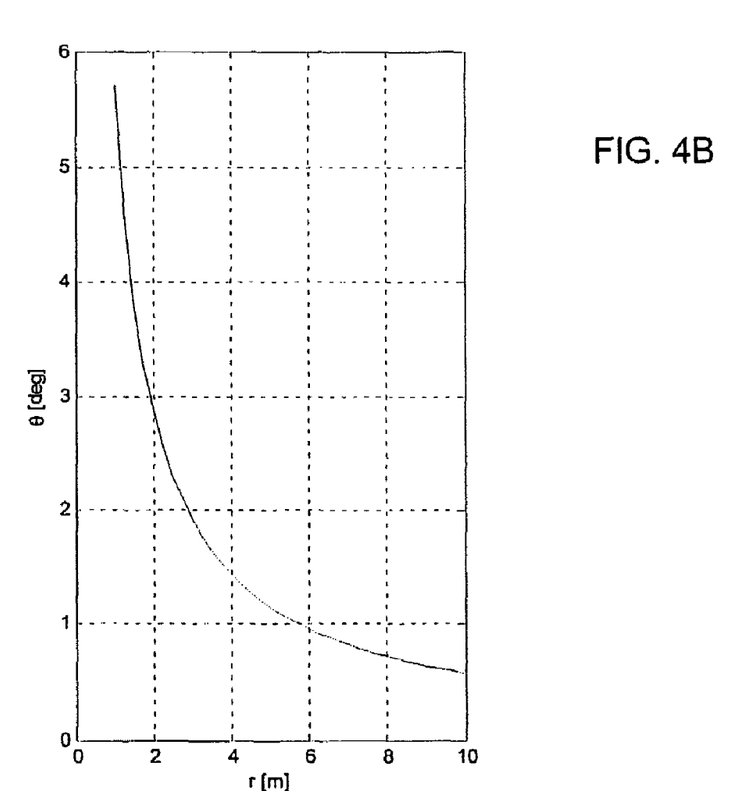

The principles of operation of the mapping sensor system are illustrated with reference to FIG. 3. Specifically, camera 16 views the laser spots projected from laser pointers 18 onto surfaces facing the user. Given an axial offset d, the off-axis angle $\theta$ varies as a function of the distance r to the wall. If the parallax d is known, the range can be calculated. The dimension d is chosen according to the ranges to be measured and the size of the image pixels to provide the required precision of range measurement. FIGS. 4A and 4B illustrate the sensitivity of the device to errors.

Measurement of range to three non-collinear points permits calculation of the plane of the resulting triangle. At least one additional point is needed to verify that the points do in fact correspond to a flat surface. Mapping out of the walls surrounding the user is performed automatically as the user moves by identifying planes corresponding to walls. Doors are found by identifying optical paths which traverse surfaces established to be walls. Mapped out walls may in turn serve as fixed reference planes in order to correct drift of the INS. The net result is tracking of the user's position together with mapping out of the surrounding walls and doors. This information is transmitted via communication device 12 directly or indirectly to all other firefighters.

The communication system is preferably a short range digital wireless network where each firefighter's personal unit communicates with the other nearby units and synchronizes data between them. As a result, each personal unit serves as a relay station for the information from firefighters in his vicinity.

Figure 5:
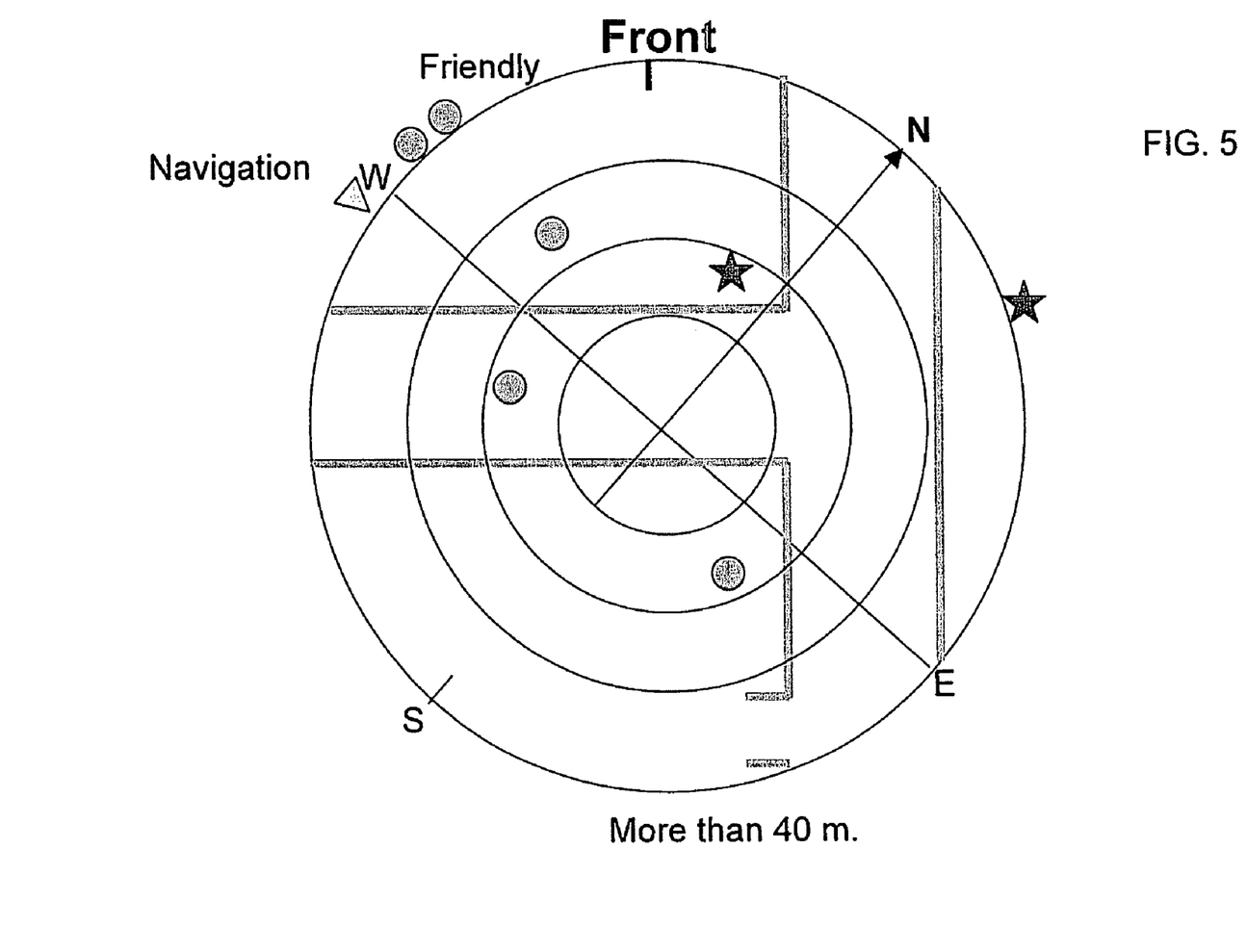
FIG. 5 is a schematic representation of a user display for use with the body mounted unit of FIGS. 1 and 2.
Figure 6A:
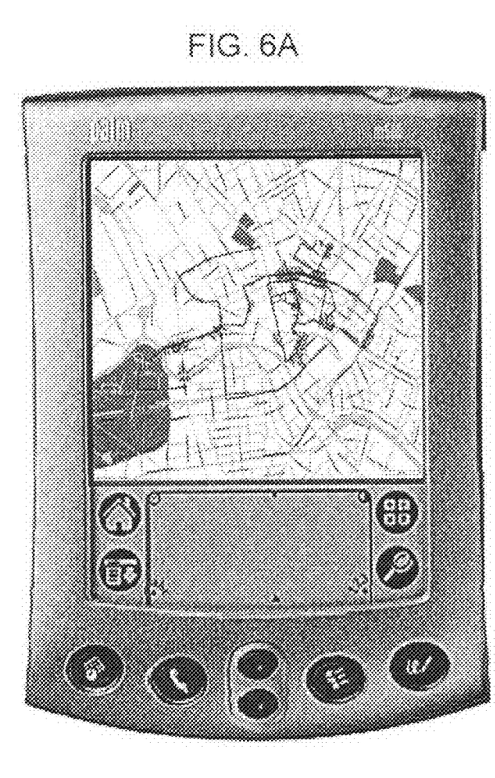
FIGS. 6A and 6B are schematic representations of a more sophisticated display unit implemented using a PDA and providing zoomed display options.
Figure 6B:
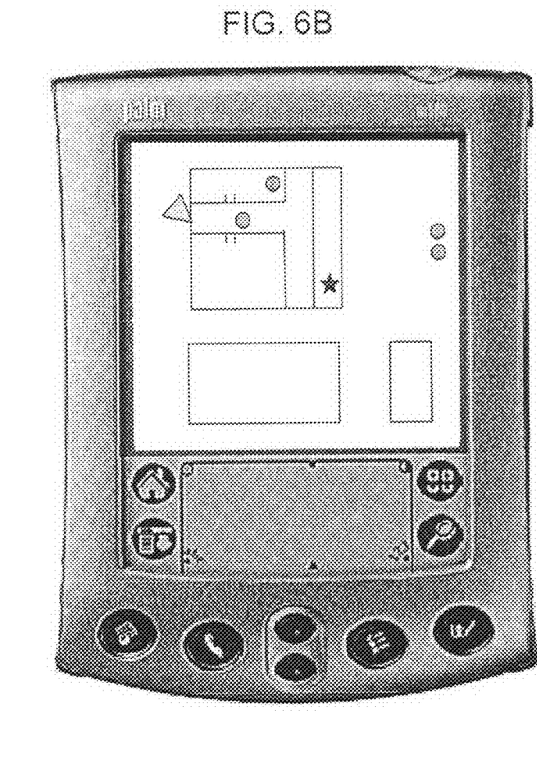
Figure 7:
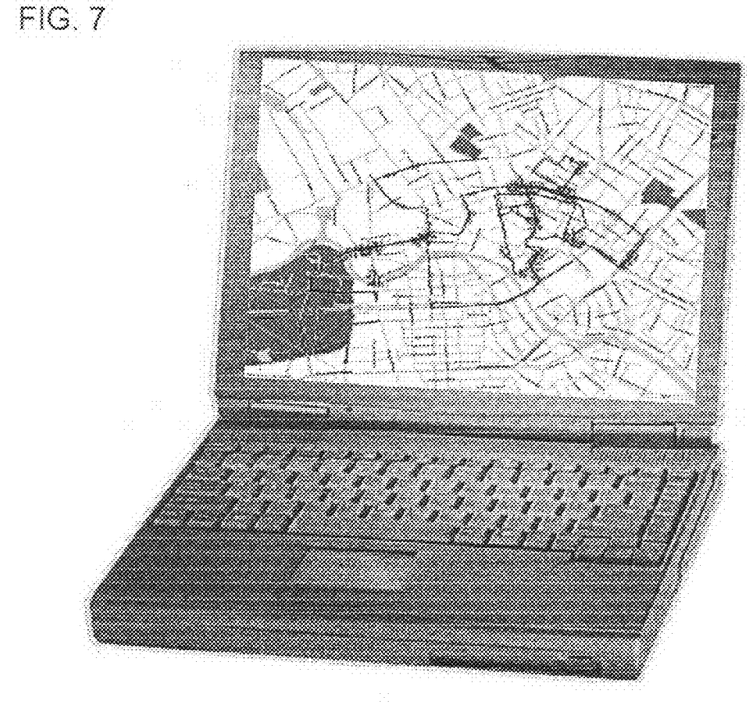
FIG. 7 is a schematic representation of a mobile remote command control system for collecting and processing data from the body mounted units and coordinating operations.

Each firefighter preferably has his own personal display to indicate his own position relative to the surrounding building(s), personnel and other information. This may be achieved as shown by use of a wristwatch-type display (see FIG. 5) which displays icons representing different information: other members of my team (circles); centers of the fire (stars) etc. The information is preferably presented in the context of a correctly oriented and positioned outline of the rooms of the building, to whatever extent they are known.

Where more display options are required, such as for a commander, a more sophisticated user interface may be used. One such option is illustrated here schematically in FIGS. 6A and 6B where a PDA is used with zoom-out (FIG. 6A) and zoom-in (FIG. 6B) capabilities to allow both an overview of a developing situation and real-time display of detailed information. A preferred implementation for the central control unit is illustrated in FIG. 7 in which a detailed display is provided with variable zoom capabilities from the level of building, street or city, and which can be used to plan and communicate instructions to the other units.

Turning now to FIGS. 8A-8E, these illustrate schematically a sequence of operations performed by the present invention, also corresponding to a method according to the teachings of the present invention. In this case, it is assumed that the system starts with prior information regarding the external structure of the building(s) to be entered, although the system can clearly operate similarly without such prior knowledge.

Figure 8A:
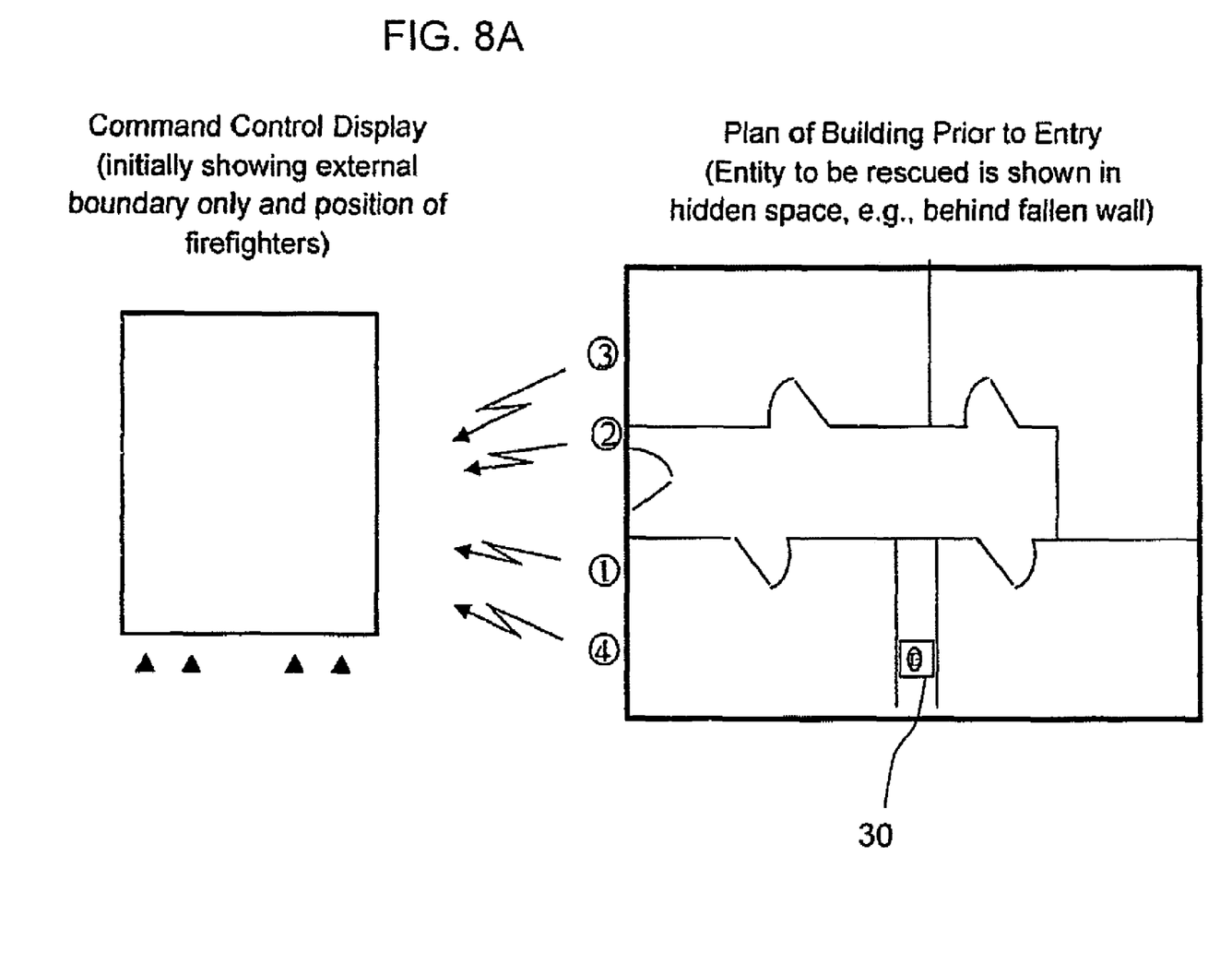
FIGS. 8A-8E are schematic representations of a sequence of operation of the information sensing and sharing system of the present invention during exploration of a previously unmapped building on fire.

Firstly, as shown in FIG. 8A, firefighters (1)-(4) are ready to enter a building on fire under the coordination of a command control unit with a display as illustrated on the left-hand-side of the figures. Initially, only the external boundary of the building is available and the interior appears blank. The right-hand plan view represents unknown details of the actual building which includes a civilian 30 trapped in a hidden space, such as behind a fallen wall.

Figure 8B:
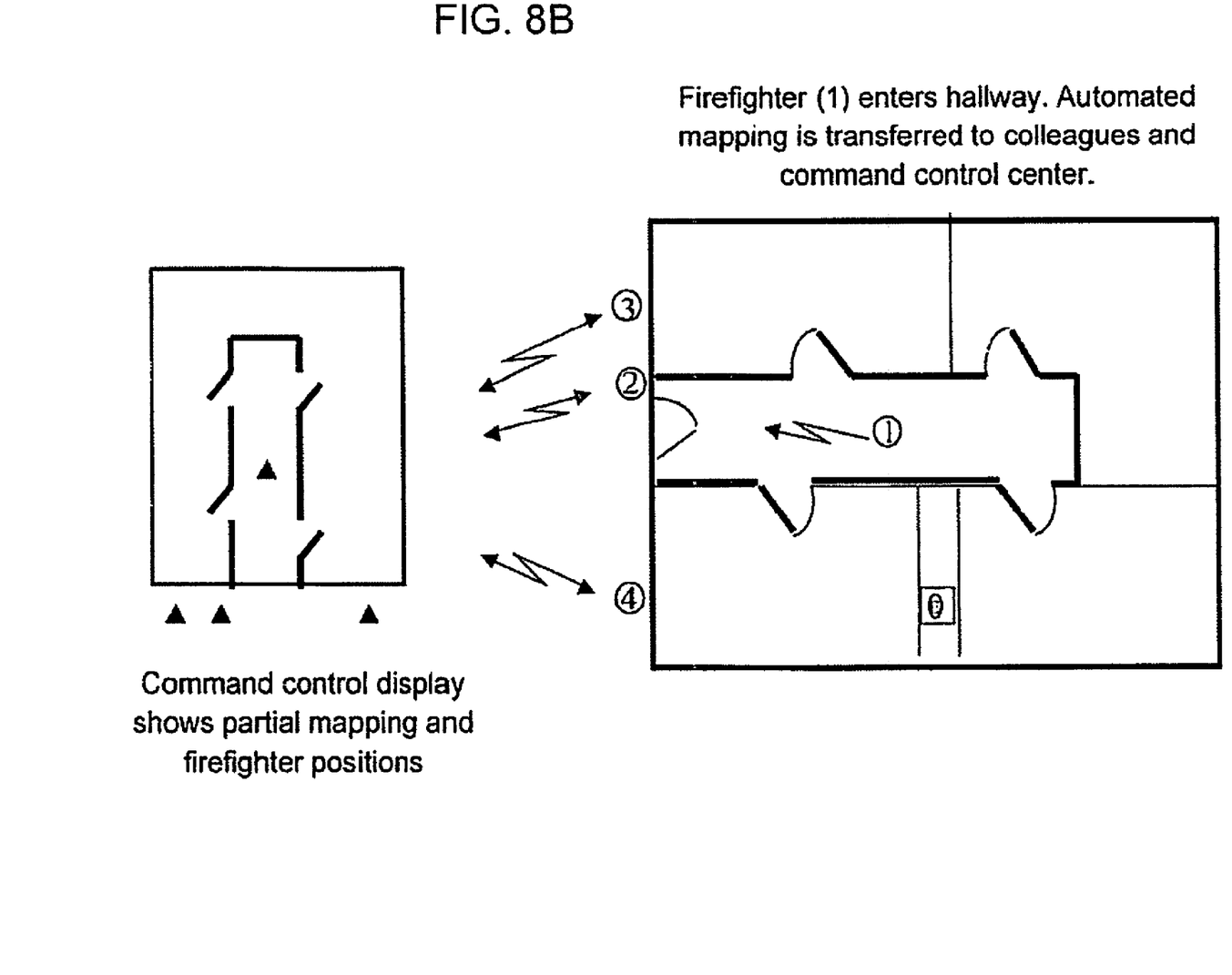

FIG. 8B shows the situation after firefighter (1) has entered the hallway of the building. As he moves and turns, the mapping sensor system performs automated mapping of the walls and doorways and transfers them by wireless communication to the other team members and the command control center. At this stage, the command control display shows a partial mapping of the building and the firefighter positions.

Figure 8C:
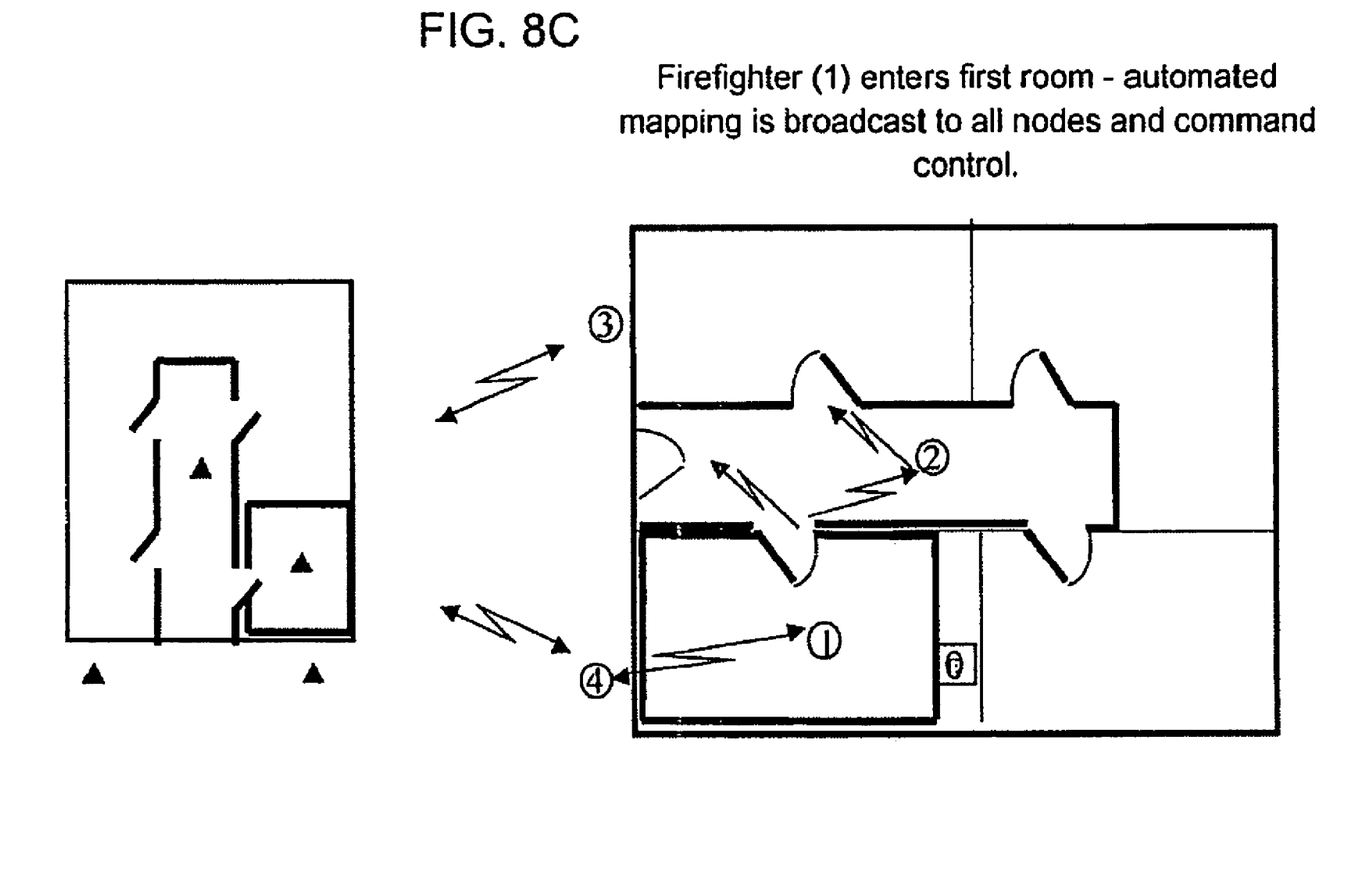

FIG. 8C shows the situation after firefighter (1) enters a first room and firefighter (2) has entered the hallway. Automated mapping of the first room is broadcast to all nodes and to the command control.

Figure 8D:
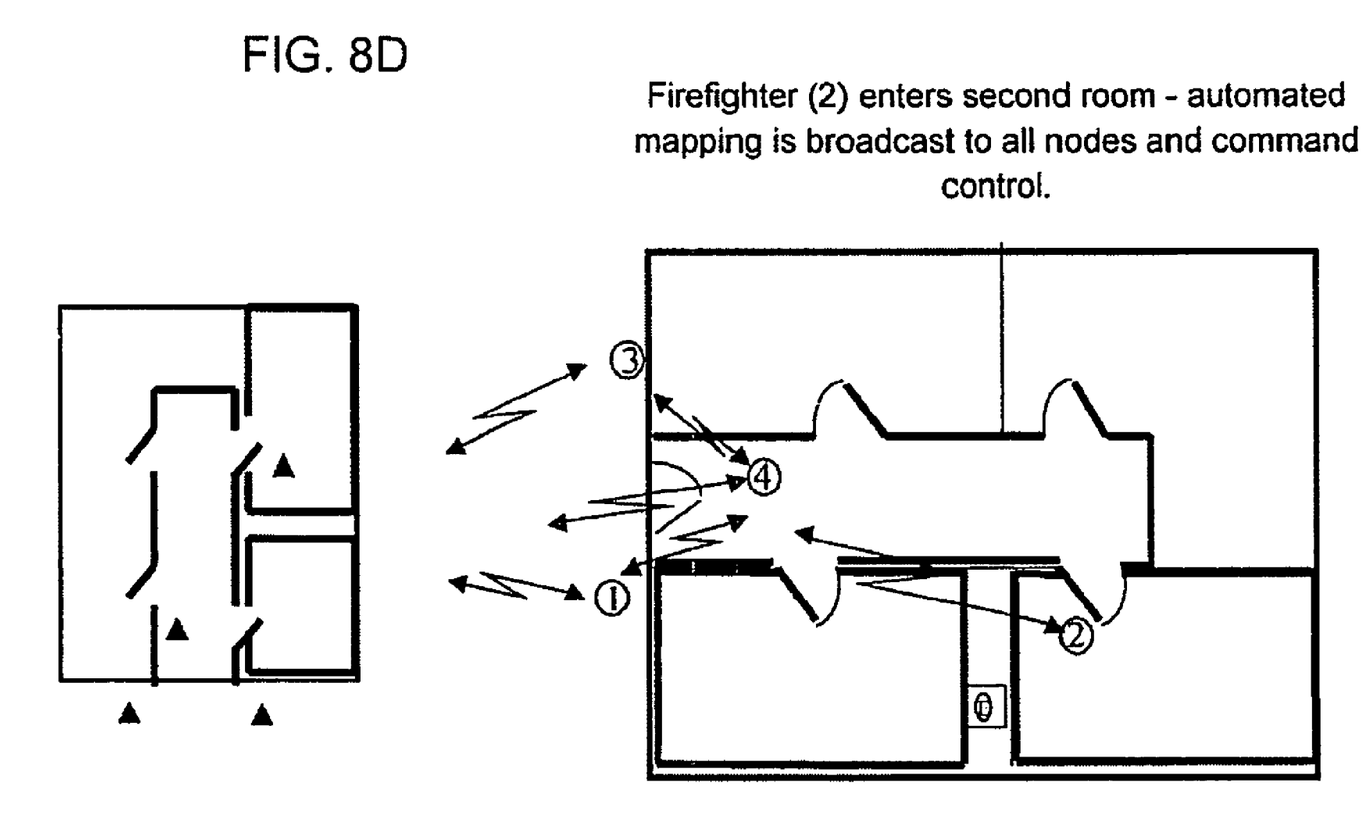
Figure 8E:
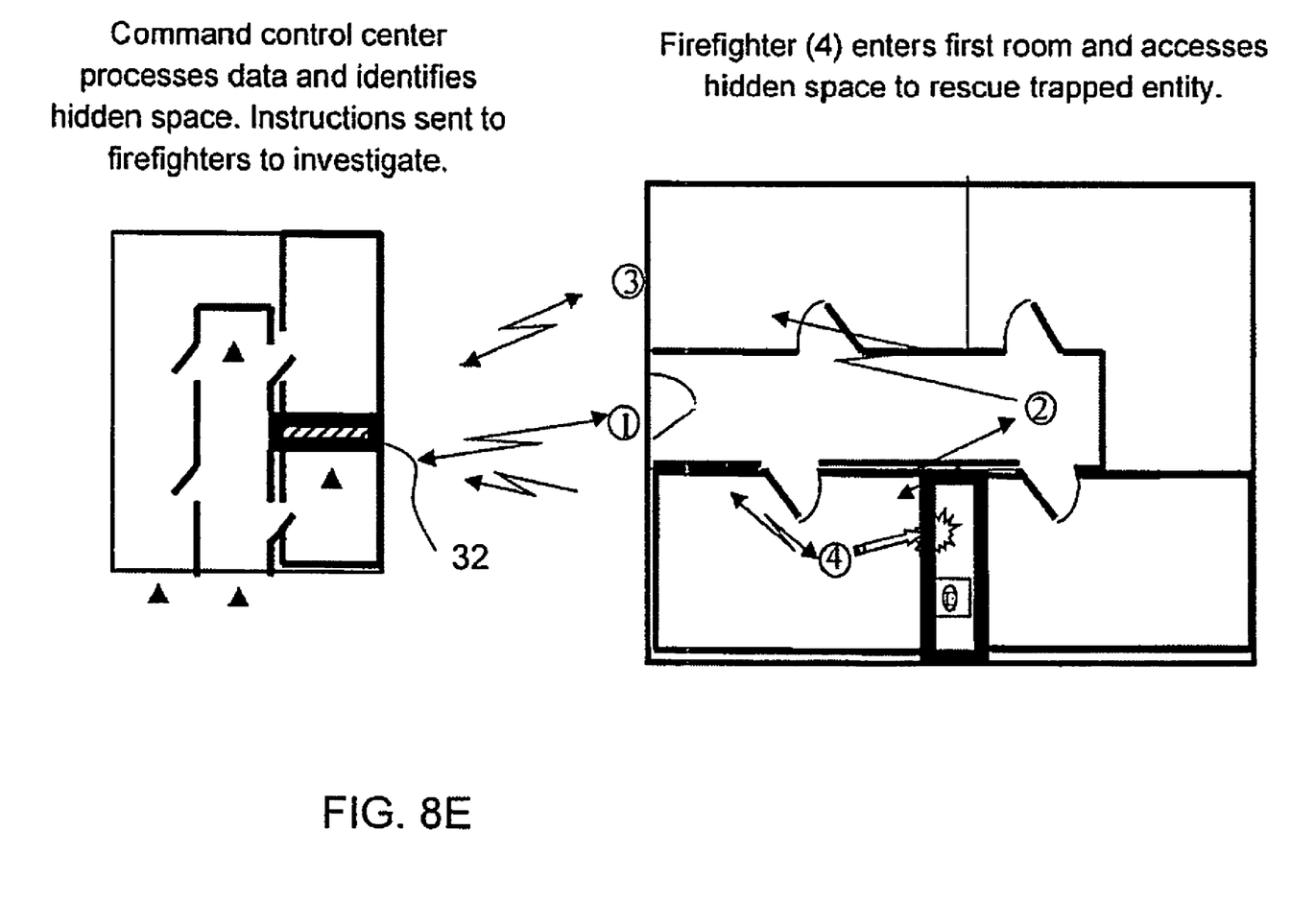

FIG. 8D shows the situation after firefighter (2) has entered a second room. Automated mapping is broadcast to all nodes and to the command control. At this point, as illustrated in FIG. 8E, processing of the data at the command control center reveals that there is a hidden space 32 between the first and second rooms. Instructions are sent to the firefighters to investigate this hidden space. Firefighter (4) then returns to the first room and accesses the hidden space to rescue the trapped civilian 30.

It will be appreciated that the above descriptions are intended only to serve as examples, and that many other embodiments are possible within the scope of the present invention as defined in the appended claims.

What is claimed is:

1. A system for automatic mapping of a walled structure, the system comprising at least one mobile unit configured to be mounted on the body of a user in a hands-free manner, said mobile unit including:
   (a) at least part of a position tracking system for tracking a current position of said mobile unit;
   (b) a wall detection system including a sensor arrangement for measuring range data from said mobile unit to at least four points, said sensor arrangement being configured for deployment on the torso of the user; and
   (c) a mapping processor associated with both said position tracking system and said wall detection system, said mapping processor being configured to process said range data and, if said at least four points lie on a common plane according to a defined criterion, mapping a wall in corresponding spatial relation to said current position.

2. The system of claim 1, wherein said mobile unit further includes a wireless communication link for transmitting and receiving data indicative of said mapped wails.

3. The system of claim 1, wherein said mobile unit further includes a display for displaying information including said mapped walls.

4. The system of claim 1, wherein said sensor arrangement includes:
   (a) at least four laser pointers; and
   (b) an imaging sensor for sensing spots generated by beams from said laser pointers impinging on surfaces.

5. The system of claim 4, wherein said at least four laser pointers are spaced around said imaging sensor.

6. The system of claim 4, wherein said at least four laser pointers generate substantially parallel beams.

7. The system of claim 1, wherein said mapping processor is further configured to identify range data lying beyond a mapped wall as a door.

8. The system of claim 1, wherein said position tracking system includes a plurality of inertial sensors.

9. The system of claim 8, wherein at least some of said plurality of inertial sensors are associated with footwear of the user.

10. The system of claim 8, wherein said position tracking system is further responsive to data from said wall detection system to correct drift in measurements of said plurality of inertial sensors.

11. The system of claim 1, implemented with a plurality of said mobile units, wherein each of said mobile units further includes a wireless communication link for transmitting and receiving data indicative of said mapped walls.

12. The system of claim 11, wherein said wireless communication links together form a distributed communications network.

13. The system of claim 11, further comprising a remote command control unit in wireless communication with said plurality of mobile units and configured to process said data indicative of said mapped walls from all of said mobile units.

14. The system of claim 13, wherein said remote command control unit is configured to generate a display indicative of:
   (a) walls mapped by each of at least two of said mobile units; and
   (b) a current position of a plurality of said mobile units.

15. The system of claim 11, wherein each of said mobile units is configured to generate a display indicative of:
   (a) walls mapped by each of at least two of said mobile units; and
   (b) a current position of a plurality of said mobile units.

16. The system of claim 1, wherein said wall detection system is configured to operate autonomously without input from the user.

17. A system for improving situational awareness for a plurality of users entering a walled structure, the system comprising a plurality of mobile units, each configured to be mounted on the body of one of the users, each of said mobile units including:
   (a) at least part of a position tracking system for tracking a current position of said mobile unit;
   (b) a wall mapping system for mapping the spatial relation of walls to said current position;
   (c) a wireless communication link for transmitting and receiving data indicative of said mapped walls; and
   (d) a display arrangement for generating a display indicative of:
      (i) walls mapped by each of at least two of said mobile units, and
      (ii) a current position of a plurality of said mobile units.

18. The system of claim 17, wherein at least part of each of said mobile units is configured to be mounted on the torso of the user.

19. The system of claim 17, wherein said wall mapping system is configured to operate autonomously without input from the user.

20. The system of claim 17, wherein said wall mapping system includes:
   (b) a wall detection system including a sensor arrangement for measuring range data from said mobile unit to at least four points; and
   (c) a mapping processor associated with both said position tracking system and said wall detection system, said mapping processor being configured to process said range data and, if said at least four points lie on a common plane according to a defined criterion, mapping a wall in corresponding spatial relation to said current position.

* * * * *